(12) United States Patent
Roos et al.

(10) Patent No.: US 10,875,121 B2
(45) Date of Patent: Dec. 29, 2020

(54) METHOD FOR REMOTE LASER WELDING WITH SUPERPOSED OSCILLATING MOVEMENT OF THE LASER BEAM

(71) Applicant: Bayerische Motoren Werke Aktiengesellschaft, Munich (DE)

(72) Inventors: Christian Roos, Munich (DE); Stefan Beck, Kelheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 251 days.

(21) Appl. No.: 15/988,516

(22) Filed: May 24, 2018

(65) Prior Publication Data

US 2018/0272466 A1    Sep. 27, 2018

Related U.S. Application Data

(63) Continuation of application No. PCT/EP2016/077027, filed on Nov. 9, 2016.

(30) Foreign Application Priority Data

Nov. 26, 2015  (DE) .......................... 10 2015 223 446

(51) Int. Cl.
*B23K 26/06* (2014.01)
*B23K 26/08* (2014.01)
(Continued)

(52) U.S. Cl.
CPC ........ *B23K 26/0626* (2013.01); *B23K 26/082* (2015.10); *B23K 26/0884* (2013.01);
(Continued)

(58) Field of Classification Search
CPC .......................... B23K 26/0626; B23K 26/082; B23K 26/242; B23K 26/0884; B23K 2101/006;
(Continued)

(56) References Cited

U.S. PATENT DOCUMENTS 5,603,853 A    2/1997  Mombo-Caristan
5,665,255 A  * 9/1997  Busuttil ................. B23K 26/06
                                                  219/121.63

FOREIGN PATENT DOCUMENTS

CN         104169039 A    11/2014
DE         38 20 848 A1    4/1989
(Continued)

OTHER PUBLICATIONS

Machine Translation of Langner (DE 10 2007 063456), performed Mar. 26, 2020 (Year: 2007).*
(Continued)

*Primary Examiner* — Brian W Jennison
(74) *Attorney, Agent, or Firm* — Crowell & Moring LLP

(57) ABSTRACT

A method for the remote laser welding of at least two metal sheets, where at least one metal sheet has a coating with a low boiling point, in particular for welding galvanized steel sheets, includes moving a laser beam at a welding velocity along a welding contour in order to produce a weld seam. The laser beam executes an oscillating movement which is superposed on the welding velocity, where the energy input into the joint is controlled by a power modulation, dependent on the oscillating movement, such that the energy input increases in at least one lateral oscillation periphery or a preceding oscillation periphery of the melt bath volume, but the size of the melt bath surface in the root area remains unaffected.

12 Claims, 4 Drawing Sheets

(51) Int. Cl.
*B23K 26/242* (2014.01)
*B23K 26/082* (2014.01)
*B23K 101/18* (2006.01)
*B23K 101/34* (2006.01)
*B23K 103/04* (2006.01)
*B23K 103/16* (2006.01)
*B23K 103/08* (2006.01)
*B23K 101/00* (2006.01)

(52) U.S. Cl.
CPC ...... *B23K 26/242* (2015.10); *B23K 2101/006* (2018.08); *B23K 2101/185* (2018.08); *B23K 2101/34* (2018.08); *B23K 2103/04* (2018.08); *B23K 2103/08* (2018.08); *B23K 2103/166* (2018.08)

(58) Field of Classification Search
CPC .......... B23K 2101/34; B23K 2101/185; B23K 2103/04; B23K 2103/166; B23K 2103/08
See application file for complete search history.

(56) References Cited

FOREIGN PATENT DOCUMENTS

| | | |
|---|---|---|
| DE | 10 2007 063 456 A1 | 11/2008 |
| DE | 103 09 157 B4 | 5/2011 |
| DE | 10 2011 103 246 A1 | 12/2012 |
| DE | 20 2014 105 648 U1 | 12/2014 |
| DE | 10 2013 110 523 A1 | 3/2015 |
| DE | 10 2014 006 077 B3 | 4/2015 |
| EP | 0 800 880 A2 | 10/1997 |
| EP | 0 800 888 A1 | 10/1997 |
| JP | 2005-40806 A | 2/2005 |

OTHER PUBLICATIONS

Chinese Office Action issued in Chinese counterpart application No. 201680051967.X dated Mar. 4, 2019 (Seven (7) pages).

PCT/EP2016/077027, International Search Report dated Mar. 3, 2017 (Three (3) pages).

German Search Report issued in German counterpart application No. 10 2015 223 446.0 dated Apr. 28, 2016, with Statement of Relevancy (Six (6) pages).

* cited by examiner

METHOD FOR REMOTE LASER WELDING WITH SUPERPOSED OSCILLATING MOVEMENT OF THE LASER BEAM

CROSS REFERENCE TO RELATED APPLICATIONS

This application is a continuation of PCT International Application No. PCT/EP2016/077027, filed Nov. 9, 2016, which claims priority under 35 U.S.C. § 119 from German Patent Application No. 10 2015 223 446.0, filed Nov. 26, 2015, the entire disclosures of which are herein expressly incorporated by reference.

BACKGROUND AND SUMMARY OF THE INVENTION

The invention relates to a method for remote laser-beam welding of at least two metal sheets, wherein at least one metal sheet has a coating.

In remote laser-beam welding, a laser beam by way of a scanner system is directed onto the components to be processed and is guided across the components. The scanner system permits a deflection of the laser beam in one axis or multiple axes at very high processing speeds. The processing speeds can be increased further when welding is performed "on the fly", that is to say when the scanner system is fitted to a movable mechanism such as, for example, an industrial robot, and is moved by the mechanism. Remote laser-beam welding is usually performed at a large operational spacing of, for example, more than 0.4 m from the welding location.

In automotive engineering, coated metal sheets which are provided, for example, with an anti-corrosion coating, such as galvanized steel sheets, for example, are often used. The coating here in most instances has a low boiling point which is far below the melting point of the sheet-metal material. In the welding of coated metal sheets a sudden evaporation of the coating material arises which, in particular in the case of overlapping connections, leads to weld faults such as porous seams, bonding faults, splashes, and holes.

To date, approaches to solutions for improving the degassing of zinc provide the setting of a defined degassing gap. It is thus known, for example from the publication DE 10 2014 006 077 B3, for burl-type elevations to be provided by means of laser-beam melting on one of the mating partners. The additional operating step for producing the elevation and the complex chucking systems required for fixing the components are disadvantageous in this solution.

In a further approach, the coating in the region of the component to be welded is removed prior to welding. A method for laser-beam welding two coated metal sheets, in which in a first method step the coating is evaporated in regions by heating by means of a laser beam is known, for example, from the publication DE 103 09 157 B4. In a subsequent second step the metal sheets are welded in the region with the removed coating. The first and the second step are carried out in an alternating manner similar to stitch welding. The additional effort in terms of time for removing the coating, and the non-continuous design of the seam, are disadvantageous in this method.

On account of modern real-time capable seam-tracking systems the welding of fillets on the lap joint by means of remote laser welding has also become possible in the meantime. Welding herein is usually performed in an additive-free manner since the feeding of filler wire by virtue of the large operational spacing of remote welding if at all is only possible with great complexity. Moreover, because of the poor gap-bridging capability, welding is usually performed in technical terms on the zero gap which in the case of this form of seam also leads to seam faults on account of zinc degassing.

It is therefore the object of the present invention to specify a method for remote laser-beam welding of coated metal sheets by way of which the seam quality can be further improved and which, if at all, has the disadvantages described above only to a reduced extent.

In the method according to the invention for remote laser-beam welding of at least two metal sheets, wherein at least one metal sheet has a coating with a low boiling point, in particular for welding galvanized steel sheets, a laser beam for generating a weld seam is moved at a welding velocity along a welding contour. The laser beam herein carries out an oscillating movement which is superposed on the welding velocity. In order for the seam quality to be improved, the energy input into the joint by way of an output modulation that depends on the oscillating movement is controlled in such a manner that the energy input into at least one lateral oscillation peripheral region, or into a preceding oscillation peripheral region, increases the weld pool volume but leaves the size of the weld pool area in the root region unaffected.

The output modulation is performed by a modification of the output of the laser beam. The focal position of the laser beam during the method remains unchanged, the laser beam preferably being focused on the welding location.

The method improves the gap-bridging capability and reduces the influence of the evaporated zinc in that the weld pool quantity on the surface is increased without the proportion of evaporated zinc increasing to the same extent. In particular, a weld pool which in the oscillation peripheral region has only a minor weld pool depth is generated.

The output in the oscillation peripheral region is significantly reduced in relation to the maximum welding output that is used for welding. The maximum welding output is usually chosen such that welding is performed by way of the deep-weld effect while configuring a keyhole. The reduced output is significantly reduced in relation to the maximum welding output, that is to say to such an extent that the weld pool area in the root region, thus the cross-sectional area in the lowermost weld pool region, is not further enlarged by it. The significantly reduced output is preferably reduced to the extent that no deep-weld effect is created on account thereof, or no keyhole is configured, respectively.

The laser beam is guided along the welding contour, that is to say the envisaged profile of the weld seam, at a welding velocity. The oscillating movement is additionally superposed.

The oscillating movement is a periodic non-damped oscillation of the laser beam across the component surface, along and/or transverse to the welding direction. The oscillation is performed at a frequency of at least 150 Hz, preferably at least 200 Hz. The amplitude of the oscillation is preferably in the range from 0.7 to 2 mm.

The oscillation peripheral region refers to the external 25% of the oscillating movement and includes the reversal point of the oscillating movement. The lateral oscillation peripheral region in relation to the welding direction is laterally beside the welding location, and the preceding oscillation peripheral region in the welding direction lies ahead of the welding location, at the front periphery of the oscillating movement. The welding location herein is referred to as that position on the workpiece at which the laser beam would be positioned if the movement of the laser beam were based only on the welding velocity but not on the oscillation.

In order for root-fusion welds to be reduced and for the bonding of the components to be improved in the configuration of a fillet on the lap joint, the output modulation in one design embodiment includes welding at a reduced output while the laser beam is deflected laterally to the welding direction onto an oscillation peripheral region on the lower metal sheet. In one preferred design embodiment, welding is furthermore performed at a reduced output as long as the laser beam is deflected laterally to the welding direction in the direction toward the lower metal sheet. In order for the weld pool surface to be widened, the oscillation in the case of this exemplary embodiment is preferably performed in a manner centric to the welding contour.

In one preferred design embodiment, the quality of the fillet can be further enhanced by reducing the influence of zinc degassing in that the output modulation furthermore includes welding at a reduced output while the laser beam is deflected onto an oscillation peripheral region on the upper metal sheet. The reduction of the laser beam output is performed such that a superficial material fusing takes place in the oscillation peripheral region of the upper metal sheet, such that the zinc layer that is disposed between the components does not evaporate or evaporates only to a limited extent. In combination with the reduction of the output in the case of an oscillation across the lower metal sheet, a seam-bridging ability of up to 1.5 mm can be achieved in a process-reliable manner by virtue of the enlarged weld pool volume. Complex chucking systems can be reduced or even entirely dispensed with in the case of this design embodiment.

The term deflected in the context of this application is to be understood in relation to the pre-determined welding contour and welding location. Laterally deflected means that the laser beam in the welding direction is laterally offset beside the welding contour. The welding contour herein does not necessarily have to be congruent with the component abutment, but can be offset laterally to the latter, for example offset toward the upper metal sheet. Preceding, or deflected toward the front, means that the laser beam in the welding direction is located ahead of the welding location.

In order to obtain a more pronounced delimitation between regions having a deep weld pool and regions having only superficial fusing, the oscillating movement in one design embodiment is a harmonic, for example sinusoidal, oscillation, and the output modulation is performed in such a manner that the output of the laser beam changes abruptly between a first reduced output on the lower metal sheet, a second reduced output in the oscillation peripheral region on the upper metal sheet, and a maximum welding output. The first reduced output preferably has a lower value than the second reduced output.

In one preferred design embodiment the first reduced output on the lower metal sheet is 25 percent (%) to 10%, preferably 20% to 10%, of the maximum welding output, and the second reduced output of the laser beam in the oscillation peripheral region across the upper metal sheet is 60% to 90%, preferably 65% to 75%, of the maximum welding output.

In one further design embodiment which is preferably used for configuring an I-seam on the lap joint, the oscillating movement is performed so as to precede the welding velocity, wherein the output modulation is performed in such a manner that the minimum output is present at least at the preceding reversal point of the oscillating movement, and the maximum welding output is present at least at the rear reversal point of the oscillating movement. The leading beam with the reduced output causes an evaporation of the coating that leads and is integrated in the welding process. The time window for the degassing of the zinc is thus enlarged, and weld seam faults can be reduced.

The preceding oscillating movement in one design embodiment herein is preferably a harmonic, for example sinusoidal, oscillation along the welding direction that precedes the welding position, such that the laser beam is deflected up to a preceding location which lies ahead of the welding position, and is guided back to the welding position, a sawtooth-type movement of the laser beam on the component resulting on account thereof. The output of the laser beam in this design embodiment is modulated in a continuous, preferably sinusoidal, manner between the maximum welding output at the welding location and the minimum output on the preceding reversal point of the oscillation. The vapor capillary is stretched in the welding direction such that the conditions for the degassing of the zinc are improved. The welding velocity can advantageously be kept constant such that the improved welding conditions can be provided without any trade-off in terms of the production times.

In this design embodiment, the minimum output at the reversal point of the leading oscillation is preferably reduced to 30% to 10%, in particular to 20% to 10%, of the maximum welding output.

A positively controllable process design results when the welding velocity in one design embodiment is kept constant.

In principle, it is also conceivable that a two-dimensional oscillation in the longitudinal direction and the transverse direction in relation to the welding direction, for example such as in the form of a horizontal figure 8, is used in order for the advantages described to be achieved.

The quality of the weld seam can be significantly improved by the method described above without the use of an additive, such as of a filler wire, for example. The gap-bridging capability is increased by the larger quantity in terms of the weld pool, on account of which the requirements to be met by the component abutment can be reduced. Fewer chucking elements can be used, this leading to a benefit in terms of time and to higher flexibility in the production. The seam quality can simultaneously be increased on account of the improved or reduced, respectively, zinc degassing. Good seam surfaces can be achieved even without the use of a process gas. The method described above is thus particularly suitable for use in the additive-free welding of galvanized steel sheets in the lap joint.

The properties, features, and advantages of this invention described above, and the manner in which the properties, features, and advantages are achieved, will become more evident and more clearly understandable in the context of the description hereunder of the exemplary embodiments. To the extent that the term "can" is used in this application, this refers to both the technical potential as well as to the actual technical implementation.

Other objects, advantages and novel features of the present invention will become apparent from the following detailed description of one or more preferred embodiments when considered in conjunction with the accompanying drawings.

Exemplary embodiments will be explained hereunder by means of the appended drawings.

DETAILED DESCRIPTION OF THE DRAWINGS

Figure 1:
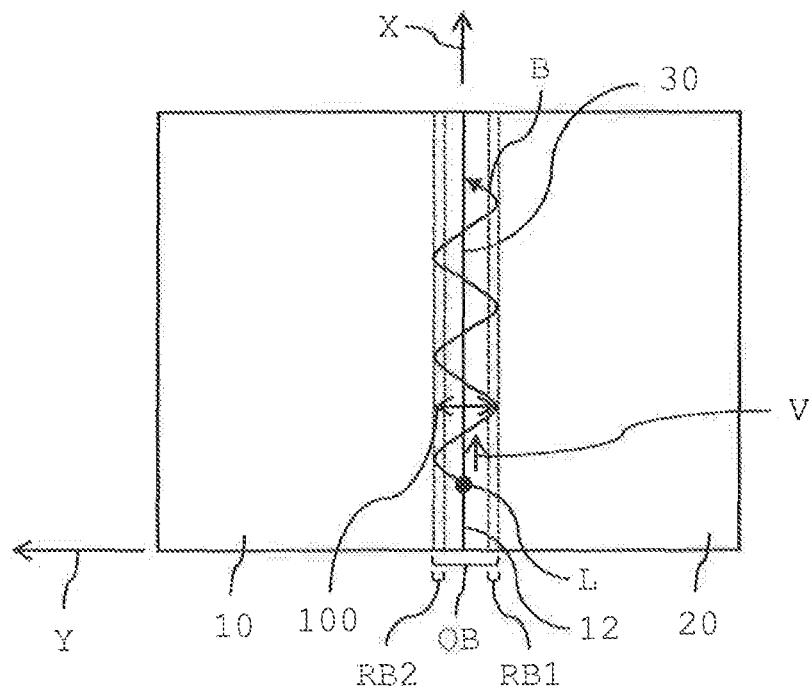
FIG. 1 shows a plan view of a component assembly in a lap joint for configuring a fillet.

FIG. 1 shows a first and a second component 10 and 20 in the form of galvanized steel sheets which are disposed in a lap joint, a fillet to be configured by means of remote laser-beam welding at the abutting edge 12 of the components 10 and 20. To this end, a laser beam L is moved along a welding contour 30 across the components. The laser beam L describes a track curve B which is composed of a constant welding velocity V in the welding direction and of an oscillating movement 100 transverse to the welding direction. The track curve illustrated in FIG. 1 is illustrated in a purely schematic manner; in fact, there are very many more oscillations performed such that the laser beam covers the oscillation region OB between the reversal points of the oscillating movement 100 in an almost comprehensive manner.

The welding contour 30, that is the envisaged profile of the laser seam, in FIG. 1 is illustrated so as to be identical to the abutting edge 12. Alternatively, the welding contour can also be provided so as to be laterally offset in relation to the abutting edge 12, for example displaced onto the upper metal sheet 10 by a predefined distance. While the welding contour 30 illustrated in FIG. 1 is a straight line, the welding contour can of course also have: another profile, for example have an arcuate profile.

Figure 2:
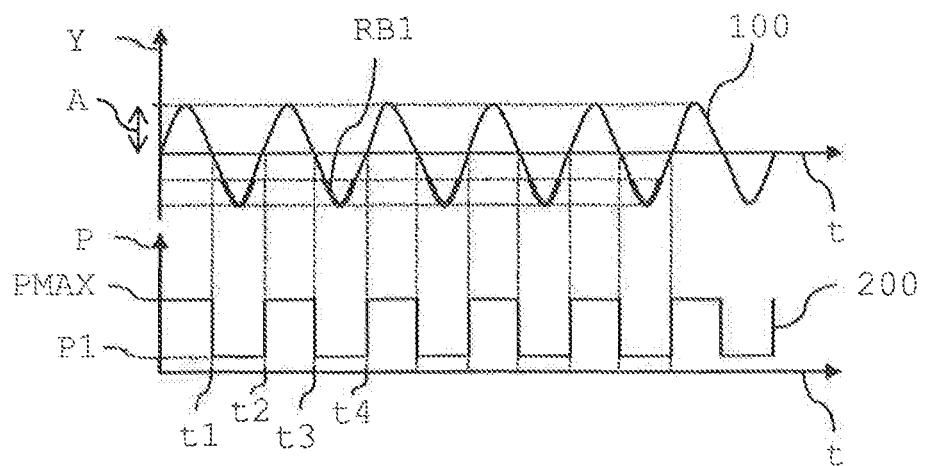
FIG. 2 shows the profile of the beam oscillation and of the output modulation over time, according to a first exemplary embodiment.

FIG. 2 shows the profile of the oscillating movement 100 in the y-direction (transverse to the welding direction) over time t. The oscillating movement 100 is a sinusoidal oscillation transverse to the welding direction X, having the amplitude A. The oscillating movement 100 is performed so as to be centric in relation to the welding contour 30, that is to say that the laser beam L in the y-direction and the −y-direction, respectively, shuttles transversely to the welding contour, and in an alternating manner is deflected in each case about the amplitude A in the direction toward the upper metal sheet 10 (y-direction) or toward the lower metal sheet 20 (−y-direction).

The output modulation 200 is furthermore illustrated in FIG. 2 as the time profile of the laser output P over time t. The laser output P is modulated abruptly between a maximum welding output PMAX and a reduced laser output P1. P1 in this exemplary embodiment is 20 percent of the maximum welding output PMAX. The temporal point of the output modification is performed so as to depend on the oscillating movement 100. Welding at maximum welding output PMAX is performed while the laser beam L is deflected in the direction toward the upper metal sheet 10, and welding at a reduced laser output P1 is performed while the laser beam is deflected in the direction toward the lower metal sheet 20. The output of the laser beam L is reduced to the value P1 not only in the lateral oscillation peripheral region RB1 but during the entire oscillating movement 100 that is directed onto the lower metal sheet 20.

The abrupt output modulation 200 is performed when the laser beam L crosses the welding contour 30 (at the temporal points t1, t2, t3, etc.).

Figure 2A:
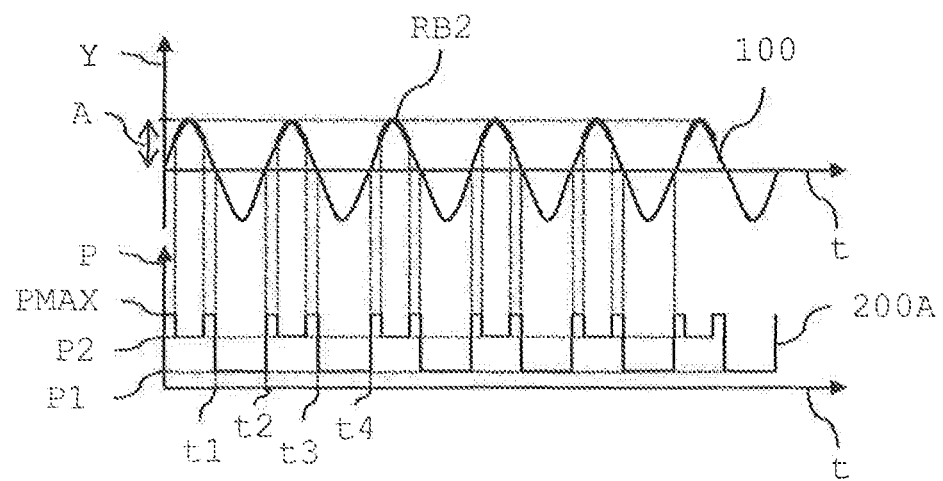
FIG. 2A shows the profile of the beam oscillation and of the output modulation over time, according to a second exemplary embodiment.

FIG. 2A shows an alternative output modulation 200A so as to depend on the oscillating movement 100. The oscillating movement 100 in this exemplary embodiment is the same sinusoidal oscillation as has been described in the context of FIG. 2.

The output modulation 200A is performed abruptly between a maximum welding output PMAX, a first reduced output P1, and a second reduced output P2, so as to depend on the oscillating movement 100.

More specifically, the maximum output PMAX used for welding is reduced to the first reduced value P1 (20% of PMAX) when and as long as the laser beam L is deflected by the oscillating movement 100 in the direction toward the lower metal sheet 20. As the welding contour 30 is crossed in the direction toward the upper metal sheet 10, the output P of the laser beam L is increased abruptly to the maximum welding output PMAX. To this extent, the output modulation 200A is identical to the modulation 200 of the first exemplary embodiment.

However, in the course of the oscillation across the upper metal sheet 10, a further output modification is performed. The welding output P is reduced abruptly to a second reduced output P2 (70% of PMAX) as soon as and as long as the laser beam is deflected into a lateral oscillation peripheral region RB2 on the upper metal sheet, that is to say carries out the external 25% of the oscillating movement across the upper metal sheet. The output P is raised to the maximum value PMAX again as soon as the laser beam L exits the oscillation peripheral region RB2 in the direction of the welding contour 30 again.

The output reductions to the values P1 and P2, respectively, are chosen such that the energy input on account of the reduced laser outputs P1 and P2 causes only a superficial material fusing.

The width of the weld pool on the surface is increased without enlarging the weld pool area in the root region by way of the output modulations 200, 200A described. Additional weld pool volume is thus provided without the proportion of evaporated zinc being notably increased. This results in a significantly increased gap-bridging capability while simultaneously improving the seam quality by reducing the influence of zinc degassing.

Figure 3:
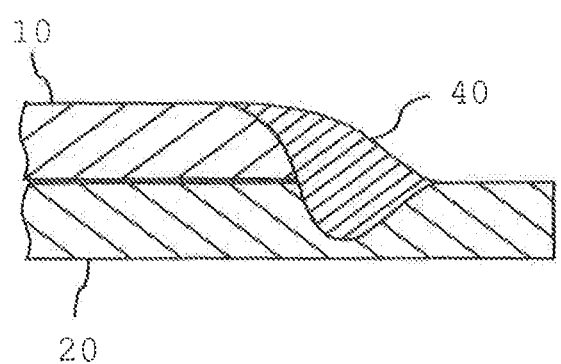
FIG. 3 shows a sectional view of a fillet that has been configured using the method according to the invention.

FIG. 3 in an exemplary manner shows a cross-section through a fillet such as can be configured by way of the combination of beam oscillation and output modulation described. The edges of the upper metal sheet 10 are cleanly fused by the welding. A fillet 40 having a significantly higher seam width to seam depth ratio is generated than is possible by way of conventional laser welding without a filler wire, for example having a ratio of 4:1. Root-fusion welds can furthermore be avoided, reliable welding being performed, wherein the zinc layer on the lower side of the lower metal sheet 20 remains intact.

Figure 4:
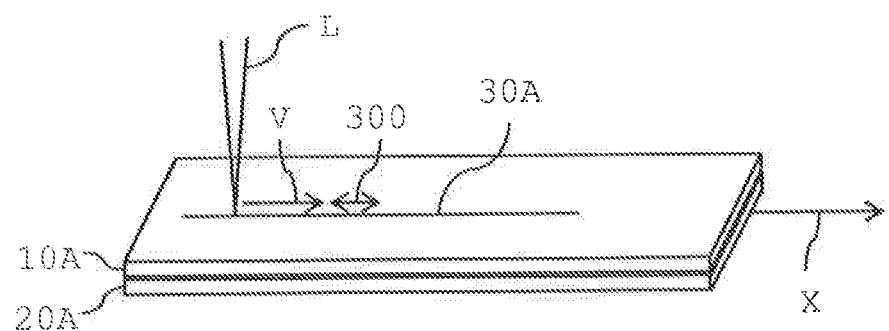
FIG. 4 shows a plan view of two metal sheets that are disposed in a lap joint for configuring an I-seam.
Figure 5:
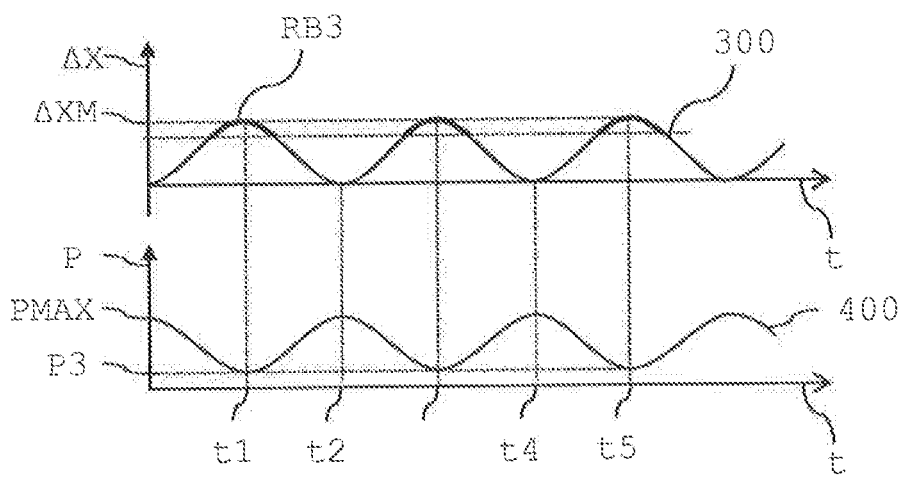
FIG. 5 shows the profile of the beam oscillation and of the output modulation over time, according to a third exemplary embodiment.
Figure 6:
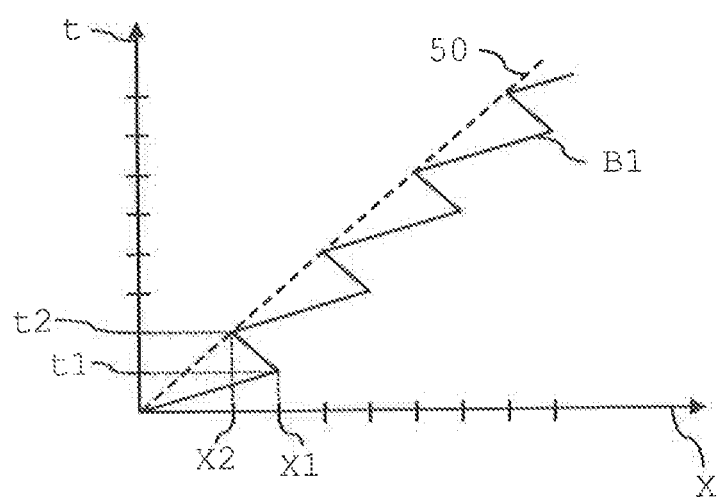
FIG. 6 shows a schematic illustration of the track curve of the laser beam.

The method according to the invention can likewise be used for configuring an I-seam on the lap joint, as is visualized by means of a further exemplary embodiment by FIGS. 4 to 6.

In order for an I-seam to be configured, the laser beam L is directed onto two components 10A and 20A in the form of galvanized steel sheets that are disposed in an overlapping manner, the laser beam L in the welding direction X being guided at a constant welding velocity V along a welding contour 30A. The welding contour 30A in an exemplary manner is illustrated as a straight line, but can also have other shapes.

The welding velocity V is furthermore superposed by an oscillating movement 300 along the welding direction X, the oscillating movement 300 in FIG. 5 being illustrated so as to depend on time t. The oscillating movement 300 shuttles in a sinusoidal manner between the value zero at the temporal points t0, t2, t4, etc., and a maximum value ΔXM at the temporal points t1, t3, t5, etc.

The oscillating movement 300 takes place exclusively in the welding direction X and so as to precede the position of the laser beam L that is predefined by the welding velocity V. The track curve of the laser beam illustrated as B1 in FIG. 6 results on account thereof. As compared to a movement at the welding velocity V without a superposed oscillation (illustrated as straight line 50), the laser beam on account of the superposed oscillating movement is now moved forward in the manner of a sawtooth along the welding contour in the welding direction X, that is to say that the position of the laser beam is temporally ahead of the welding velocity V such as, for example, at the temporal point t1 where the beam is already located at the location x1, before the beam returns back at the temporal point t2 to the location X2 that corresponds to the welding velocity V.

In order for an improved seam quality to be achieved, the output, depending on the oscillating movement, is modulated in a sinusoidal manner between a maximum welding output PMAX used for welding, and a minimum output P3 (cf. FIG. 5). The output herein achieves its minimum when the oscillating movement reaches its maximum (at the temporal points t1, t3, t5, etc.). Welding is performed at the maximum output PMAX at the temporal points when the value of the oscillating movement is zero (t2, t4, etc.). The minimum output P3 is chosen such that an energy input which causes an evaporation of the zinc above all in the joint gap between the metal sheets 10A and 20A, results in the preceding oscillation peripheral region RB3 (illustrated as a thickening on the curve 300 in FIG. 5), that is to say in the external 25% of the preceding beam movement, without that any fusing of the two metal sheets would already arise in the preceding oscillation peripheral region RB3. The minimum output in the exemplary embodiment is 20% of the maximum welding output.

The seam quality benefits from the improved degassing conditions for the zinc since the vapor capillary is elongated in the welding direction while the laser beam in the preceding region causes an evaporation of the zinc, thus enlarging the time window for the degassing of the zinc.

The methods described above are carried out using a remote laser-beam welding system which preferably has a real-time capable optical seam guiding system as is known from the prior art.

The exemplary embodiments are not true to scale and not limiting. Variations within the scope of the person skilled in the art are possible.

LIST OF REFERENCE CHARACTERS 10, 10A Component
12 Abutting edge
20, 20A Component
30, 30A Welding contour
40 Fillet
50 Straight line
100, 300 Oscillating movement
200, 200A, 400 Output modulation A Amplitude
B, B1 Track line
L Laser beam
OB Oscillation region
P, PMAX, P1, P2, P3 Laser output
RB1, RB2, RB3 Oscillation peripheral region
X Welding direction
Y Direction transverse to the welding direction
X1, X2, . . . Location
T, t0, t1, t2, . . . Time
ΔXM Maximum value of oscillation The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for remote laser-beam welding of a first metal sheet and a second metal sheet, wherein at least one of the first and second metal sheets has a coating with a low boiling point, comprising the acts of:
   moving a laser beam for generating a weld seam at a welding velocity along a welding contour;
   carrying out an oscillating movement of the laser beam which is superposed on the welding velocity; and
   controlling energy input into a lap joint between the first and second metal sheets by an output modulation that depends on the oscillating movement such that the energy input into at least one lateral oscillation peripheral region, or into a preceding oscillation peripheral region, increases a weld pool volume but leaves a size of a weld pool area in a root region unaffected, wherein the output modulation includes welding at a first reduced output while the laser beam is deflected laterally to a welding direction onto a first oscillation peripheral region on the second metal sheet wherein the second metal sheet is a lower metal sheet.

2. The method as claimed in claim 1, wherein the first and second metal sheets are galvanized steel sheets.

3. The method as claimed in claim 1, wherein a fillet is configured on the lap joint.

4. The method as claimed in claim 1, wherein the output modulation includes welding at a second reduced output while the laser beam is deflected onto a second oscillation peripheral region on the first metal sheet wherein the first metal sheet is an upper metal sheet.

5. The method as claimed in claim 4, wherein the oscillating movement is a harmonic oscillation and wherein the output modulation is performed such that an output of the laser beam changes abruptly between the first reduced output on the lower metal sheet, the second reduced output on the upper metal sheet, and a maximum welding output.

6. The method as claimed in claim 5, wherein the first reduced output on the lower metal sheet is 25% to 10% of the maximum welding output and wherein the second reduced output on the upper metal sheet is 60% to 90% of the maximum welding output.

7. The method as claimed in claim 1, wherein:
   the oscillating movement is performed so as to precede a position of the laser beam that is predefined by the welding velocity; and
   the output modulation is performed such that a minimum output is present at a preceding reversal point of the oscillating movement, and a maximum welding output is present at a rear reversal point of the oscillating movement.

8. The method as claimed in claim 7, wherein the oscillating movement is a harmonic oscillation and the output modulation is modulated in a continuous manner.

9. The method as claimed in claim 7, wherein the oscillating movement is a harmonic oscillation and the output modulation is modulated in a sinusoidal manner.

10. The method as claimed in claim 7, wherein the minimum output is reduced to 30% to 10% of the maximum welding output.

11. The method as claimed in claim 1, wherein the welding velocity is kept constant.

12. A use of the method as claimed in claim 1 for additive-free welding of galvanized steel sheets.

* * * * *